(12) United States Patent
Gretz

(10) Patent No.: US 6,965,078 B1
(45) Date of Patent: Nov. 15, 2005

(54) RAINPROOF RECESSED OUTLET BOX

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/070,344

(22) Filed: Mar. 2, 2005

Related U.S. Application Data (63) Continuation-in-part of application No. 11/009,116, filed on Dec. 10, 2004, which is a continuation-in-part of application No. 10/863,942, filed on Jun. 9, 2004.

(51) Int. Cl.[7] .............................................. H01H 9/02
(52) U.S. Cl. ........................... 174/58; 174/58; 174/60; 174/63; 174/64
(58) Field of Search ............................ 174/58, 60, 135, 174/63, 64; 220/3.2, 3.7, 3.9; 248/906

(56) References Cited

U.S. PATENT DOCUMENTS

| | | | | |
|---|---|---|---|---|
| 4,438,859 A | * | 3/1984 | Solek | 220/3.2 |
| 4,724,281 A | * | 2/1988 | Nix et al. | 174/53 |
| 5,218,169 A | * | 6/1993 | Riceman | 174/67 |

* cited by examiner

Primary Examiner—Dhiru R. Patel (57) ABSTRACT

A recessed electrical box with a closeable cover member. The box may include a flange that serves as a positioning arrangement to recess the electrical box at the correct depth with respect to the surface in which it will be mounted. The recessed electrical box includes of two pieces, including a one-piece electrical box and a one-piece cover member. The cover member is of minimal size with respect to the electrical box to minimize the cost of construction. The electrical box can be installed on an exterior wall, including either as a retrofit on a finished building or as an installation on the wall of a building under construction. The outward extending flange may include an inner flange for positioning the recessed electrical box with respect to the outer surface of the substrate on a building under construction. The inner flange is removable to facilitate installation in a retrofit situation, in which the finish layer such as siding, stucco, or masonry is installed. The recessed electrical box may include a second, outer flange, for recessing the box at the correct depth with respect to a finished surface and to occlude from view the sidewalls of the box at their juncture with the finished surface. The one-piece electrical box includes side walls of that are spaced substantially the same distance apart from the front edge to the back wall of the box.

14 Claims, 12 Drawing Sheets

RAINPROOF RECESSED OUTLET BOX

This application is a Continuation-In-Part of U.S. patent application Ser. No. 11/009,116 filed Dec. 10, 2004 and still pending, which is a Continuation-In-Part of U.S. patent application Ser. No. 10/863,942 filed Jun. 9, 2004 and still pending.

FIELD OF THE INVENTION

This invention relates to electrical junction boxes and specifically to a recessed outlet box that secures an electrical device substantially behind the exterior of a building for accommodating and protecting a duplex outlet or other electrical device therein.

BACKGROUND OF THE INVENTION

Recessed electrical boxes for retrofitting on finished walls or for use in new construction were disclosed in co-pending U.S. application Ser. Nos. 10/863,942 and 11/009,116, commonly owned by the assignee of the present invention, the contents of which are incorporated herein by reference. The recessed electrical box disclosed in the co-pending applications comprised an electrical box having an inner enclosure for housing an electrical device and an outer enclosure for recessing the inner enclosure well within a wall. One or more flanges extended outwardly from the electrical box. For mounting to new construction, a first, breakaway inner flange was left intact and utilized as is for securing the box to the newly constructed building's substrate. Conversely, if mounted to an existing building in a retrofit situation, the inner flange was broken away to allow insertion of the box within an appropriately sized hole created for the box in the existing building. An outer flange was provided for masking the siding or other wall covering at the juncture of the electrical box with the surrounding siding. A cover member having a narrow peripheral side wall was provided for closing and rainproofing the electrical device therein. The co-pending applications disclosed the outer enclosure of the electrical box being a larger size than the inner enclosure to facilitate easy access to the inner enclosure and easy shedding of any residual rainfall that penetrated therein.

Although an electrical box based on the principles of the co-pending applications provided an improved rainproof electrical box, the different size enclosures, being typically molded in one piece of plastic, unnecessarily complicated the molding process and added to the expense of producing the box.

Accordingly, the present invention improves upon the rainproof recessed outlet box of the co-pending applications by providing a rainproof recessed outlet box that is of simpler construction and more economical to produce. The electrical box includes side walls that are spaced substantially the same distance apart from the front edge of the box to the back wall. The outlet box recesses the outlet substantially behind the wall surface, thereby providing protection to the outlet from hard impacts capable of breaking the protective cover. Additionally the outlet box is of simple construction and assembled from a minimum number of separate parts. Furthermore, the construction should be such that the size of the cover is minimized, to minimize the cost of producing the outlet box.

SUMMARY OF THE INVENTION

The invention is a recessed electrical box with a closeable cover member. The box may include a flange that serves as a positioning arrangement to recess the electrical box at the correct depth with respect to the surface in which it will be mounted. The recessed electrical box is comprised of two pieces, including a one-piece electrical box and a one-piece cover member. The cover member is of minimal size with respect to the electrical box to minimize the cost of construction. The electrical box can be installed on an exterior wall, including either as a retrofit on a finished building or as an installation on the wall of a building under construction. The outward extending flange may include an inner flange for positioning the recessed electrical box with respect to the outer surface of the substrate on a building under construction. The inner flange is removable to facilitate installation in a retrofit situation, in which the finish layer such as siding, stucco, or masonry is installed. The recessed electrical box may include a second, outer flange, for recessing the box at the correct depth with respect to a finished surface and to occlude from view the sidewalls of the box at their juncture with the finished surface. The one-piece electrical box includes side walls of that are spaced substantially the same distance apart from the front edge to the back wall of the box.

OBJECTS AND ADVANTAGES

A first advantage of the recessed electrical box is that it properly recesses or positions the box at the proper depth with respect to the outer surface of the building. The electrical box may include one or more outward extending flanges that provide a positioning mechanism to recess the electrical box at the correct depth within the building's surface. The positioning mechanism is functional for both a retrofit situation, in which the finished layer such as siding or stucco is installed, or in a building under construction in which the finished layer has not been installed.

A second advantage is that a while-in-use cover member that renders the recessed electrical box rainproof, is minimal in size with respect to the box. Cover members are typically molded of expensive impact resistant plastic to meet electrical code. Keeping the cover minimal in size with respect to the box lowers the cost of production of the outlet box.

A further advantage is that the recessed electrical box positions an enclosed electrical device substantially behind the outer surface of the building. This provides added protection to the electrical device and insures that any hard impacts that destroy the cover member do not also damage the electrical device.

The recessed electrical box furthermore provides the advantage of being constructed of a minimal number of parts. It includes only two separately molded pieces, including the electrical box and the cover member. The side walls of the box are spaced substantially the same distance apart from the front edge of the box to the back wall, thereby further minimizing production costs. Construction of the box is therefore simplified and production costs are minimized as compared to similar prior art electrical boxes.

A further advantage of the recessed electrical box is that the cover member is a while-in-use cover, allowing electrical cords to remain connected to the electrical outlet within the box with the cover member closed thereon. Therefore the recessed electrical box provides rainproof protection to the outlets even while electrical cords are connected to the electrical outlets therein.

The electrical box furthermore includes integral bosses with bores therein, which may be smooth or threaded bores, for accepting fasteners from standard wall-mounted electrical devices, such as outlets or switches.

These and other objects and advantages of the present invention will be better understood by reading the following description along with reference to the drawings.

TABLE OF NOMENCLATURE

The following is a listing of part numbers used in the drawings along with a brief description:

| Part Number | Description |
|---|---|
| 20 | recessed electrical box, preferred embodiment |
| 22 | box |
| 24 | top wall |
| 26 | bottom wall |
| 28 | back wall |
| 30 | side wall |
| 32 | front opening |
| 34 | enclosure |
| 36 | front edge |
| 38 | front surface of back wall |
| 40 | integral boss |
| 42 | forward facing surface |
| 44 | bore |
| 46 | inner surface |
| 48 | outer surface |
| 50 | flange |
| 52 | cover arrangement |
| 54 | front surface of flange |
| 56 | back surface of flange |
| 58 | groove |
| 60 | webbing |
| 62 | ear of flange |
| 64 | slot or opening |
| 66 | second or forward flange |
| 67 | back surface of second flange |
| 68 | integral latch |
| 70 | slit or opening |
| 72 | latch member |

-continued

| Part Number | Description |
|---|---|
| 73 | posts |
| 74 | tongue |
| 76 | forward face |
| 78 | gap |
| 80 | cover member |
| 82 | front wall of cover member |
| 84 | stiffening peripheral wall |
| 86 | upper wall of cover member |
| 88 | lower wall of cover member |
| 90 | side wall of cover member |
| 91 | ear of cover member |
| 92 | aperture |
| 93 | tab |
| 94 | opening |
| 96 | upper edge |
| 98 | inner surface of cover member |
| 100 | integral spacers |
| 102 | gap between cover member and box |
| 104 | knockout |
| 106 | U-shaped slot in box |
| 108 | hole in substrate |
| 110 | substrate |
| 112 | fastener |
| 114 | siding |
| 116 | caulking |
| 118 | hole in substrate and siding |
| 120 | hole in second flange |
| 122 | fastener |
| 124 | duplex outlet |
| 128 | device fastener |
| 130 | face plate |
| 132 | inner enclosure |
| 134 | terminal of duplex outlet |
| 135 | outer enclosure |
| 136 | plug end |
| 138 | electrical cord |
| 140 | U-shaped slots in cover member |
| 142 | circular cord opening |
| 144 | outer surface of building |
| X | distance bosses are recessed from the front edge |
| Y | distance between top and bottom walls of box |
| Z | depth of box, front edge to back of back wall |

DETAILED DESCRIPTION OF THE INVENTION

The present invention comprises a recessed electrical box for securing an electrical device on the exterior wall of a building. The recessed electrical box has features that allow it to be easily recessed to the correct depth on either new construction or as a retrofit on the completed exterior surface existing building.

With reference to FIGS. 1–5, the box portion of a first and preferred embodiment of a recessed electrical box according to the present invention is shown. The recessed electrical box includes a box 22 having a top wall 24, a bottom wall 26, a back wall 28, side walls 30 extending orthogonally to the back wall 28, and a front opening 32 defining a cavity or enclosure 34 therein. The peripheral sidewalls 30 of the box 22 include a front edge 36 at the front opening 32. The box 22 is typically molded in one piece from plastic. Alternatively, the box 22 may be formed of metal.

Figure 1:
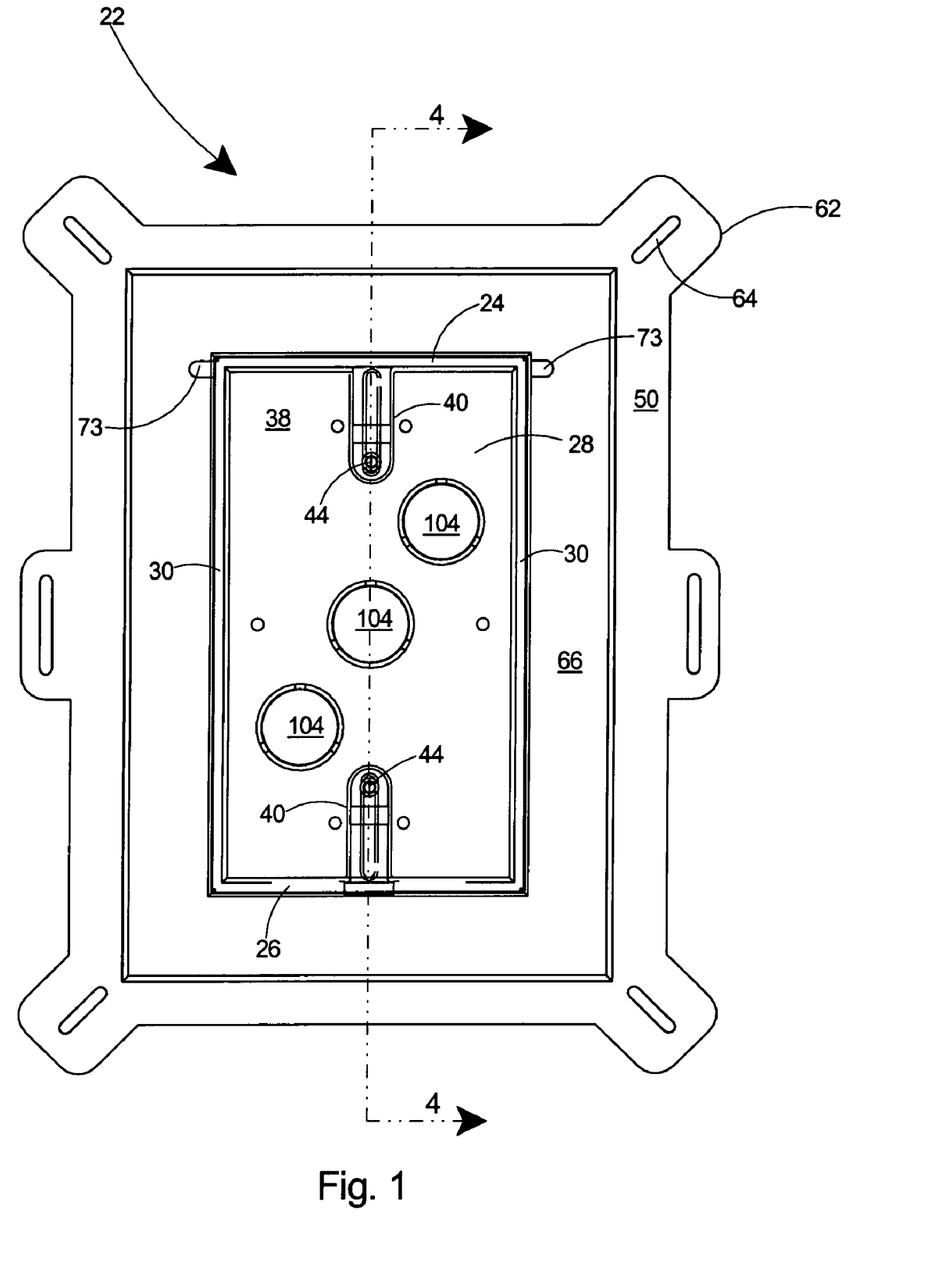
FIG. 1 is a front view of a preferred embodiment of a recessed electrical box according to the present invention.

The back wall 28, as shown in FIG. 1, includes a front surface 38. Integral bosses 40 extend from the front surface 38 of the back wall 28 and terminate in forward facing surfaces 42.

Figure 4:
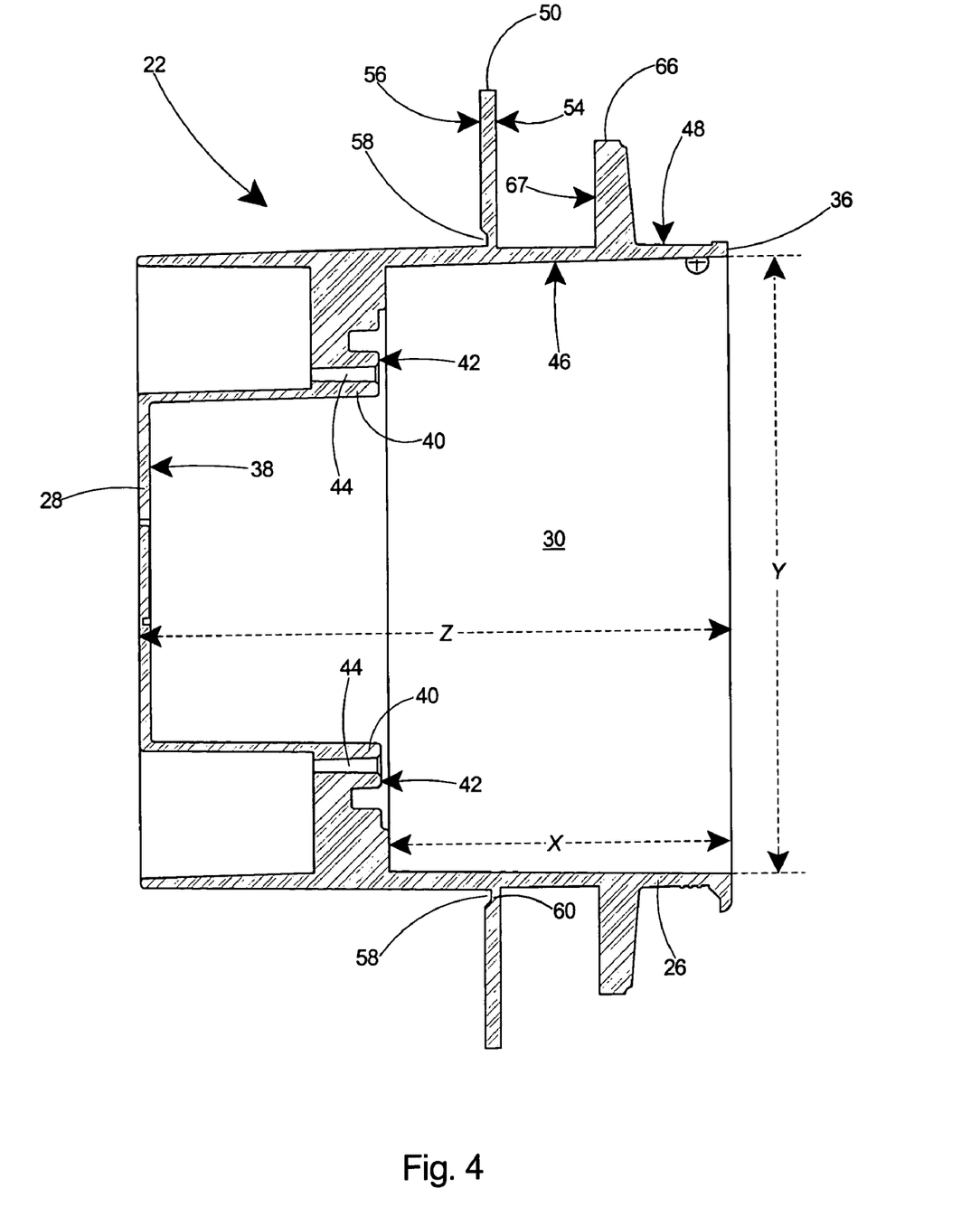
FIG. 4 is a sectional view of the recessed electrical box taken along line 4—4 of FIG. 1.

As shown in FIG. 4, the forward facing surfaces 42 of the bosses 40 are recessed a substantial distance X from the front edge 36 of the box 22. Bores 44 are included in the forward facing surfaces 42 of the bosses 40. The bores 44 may be smooth bores or threaded. The top wall 24, bottom wall 26, and side walls 30 include inner 46 and outer 48 surfaces and a flange 50 extends from the outer surfaces of the top 24, bottom 26, and side walls 30. The top wall 24 and bottom wall 26 of the box 22 are spaced substantially the same distance Y apart from the front edge 36 of the box 22 to the back wall 28 and the side walls 30 are spaced substantially the same distance apart from the front edge 36 to the back wall 28. In a preferred embodiment, the inner surface 46 of the bottom wall 26 is gradually sloped downwards toward the front opening 32 to allow any rain entering the box to easily run out of the box 22 at the front edge 36. As shown in FIG. 4, the box 22 has a total depth Z from the front edge 36 to the back side of the back wall 28. This depth Z is preferably 5.0 inches. The recessed depth X is preferably 3.0 inches. Therefore the recessed distance X in the preferred embodiment of the recessed outlet box is 60% of the total depth Z of the box 22. It is preferred that the recessed depth X be at least 40% of the total depth Z of the box 22, to insure that the later installed electrical device is positioned substantially within the outer wall of the building whether the box is installed on new construction or as a retrofit to an existing wall. The flange 50 is situated on the box 22 at such a position with respect to the recessed depth X that the box 22, when inserted within a wall to the flange 50, will recess a later installed electrical device substantially behind the wall.

Figure 11:
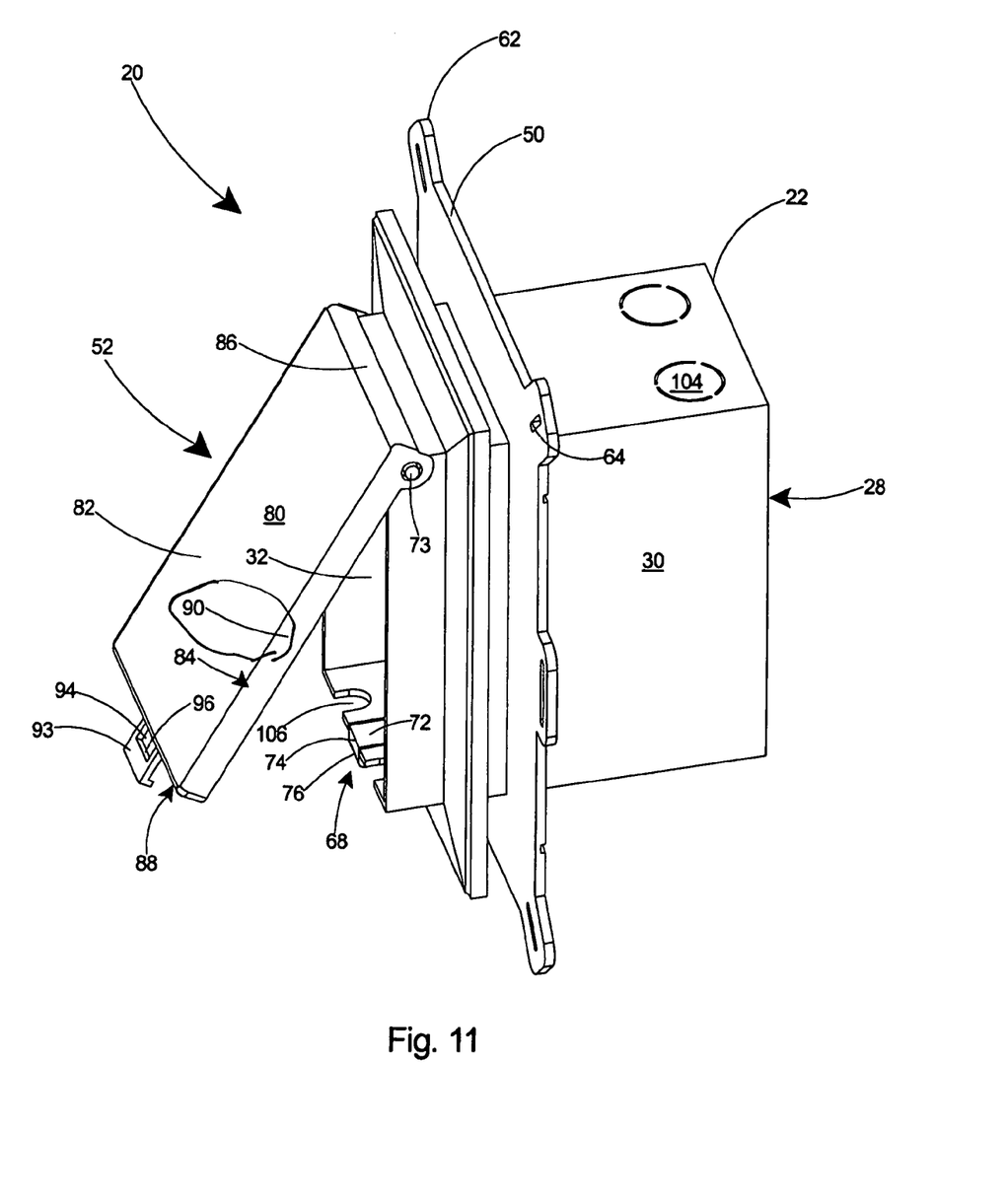
FIG. 11 is another perspective view of the recessed electrical box of FIG. 1.

With reference to FIG. 11, the recessed electrical box 20 includes a cover arrangement 52 for closing the front opening 32 of the box 22 in a rain tight closure.

As shown in FIG. 4, the flange 50 includes a front surface 54 and a back surface 56. Grooves 58 are provided in the back surface 56 of the flange 50 adjacent the walls 24, 26, 30 of the box 22 enabling removal of the flange 50 at the walls. The grooves 58 are deep enough that the flange 50 may be easily separated at the narrow webbing 60 that remains between the flange 50 and the walls 24, 26, 30. The flange 50 is typically removed by running a utility knife down the groove 58 until the webbing 60 is cut through or until the cut is scored deep enough to allow removal of the flange 50 by repeated flexing of the flange 50 by the hand or with the aid of a gripping tool such as pliers. Removal of the flange 50 creates a smooth outer periphery on the box 22.

With reference to FIG. 1, the box 22 further includes ears 62 extending outwardly from the flange 50. Openings or slots 64 are provided in the ears, which can be used for receipt of fasteners (not shown) when securing the electrical box to a wall.

Figure 2:
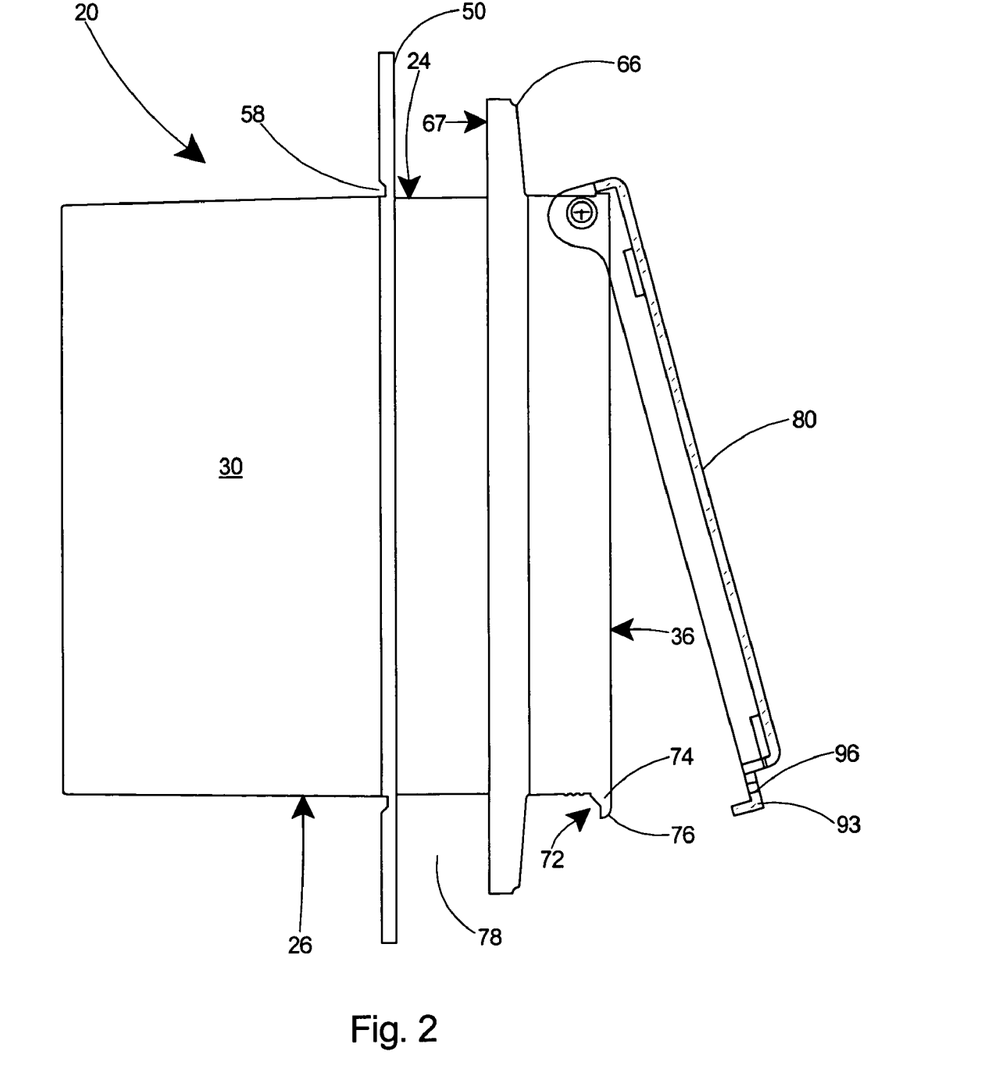
FIG. 2 is a side view of the recessed electrical box of FIG. 1.

As shown in FIG. 2, the box 22 may further include a second or forward flange 66 extending outwardly from the outer surfaces of the top 24, bottom 26, and side walls 30. The second flange 66 is located between the flange 50 and the front edge 36 of the box 22 and includes a back surface 67.

Figure 5:
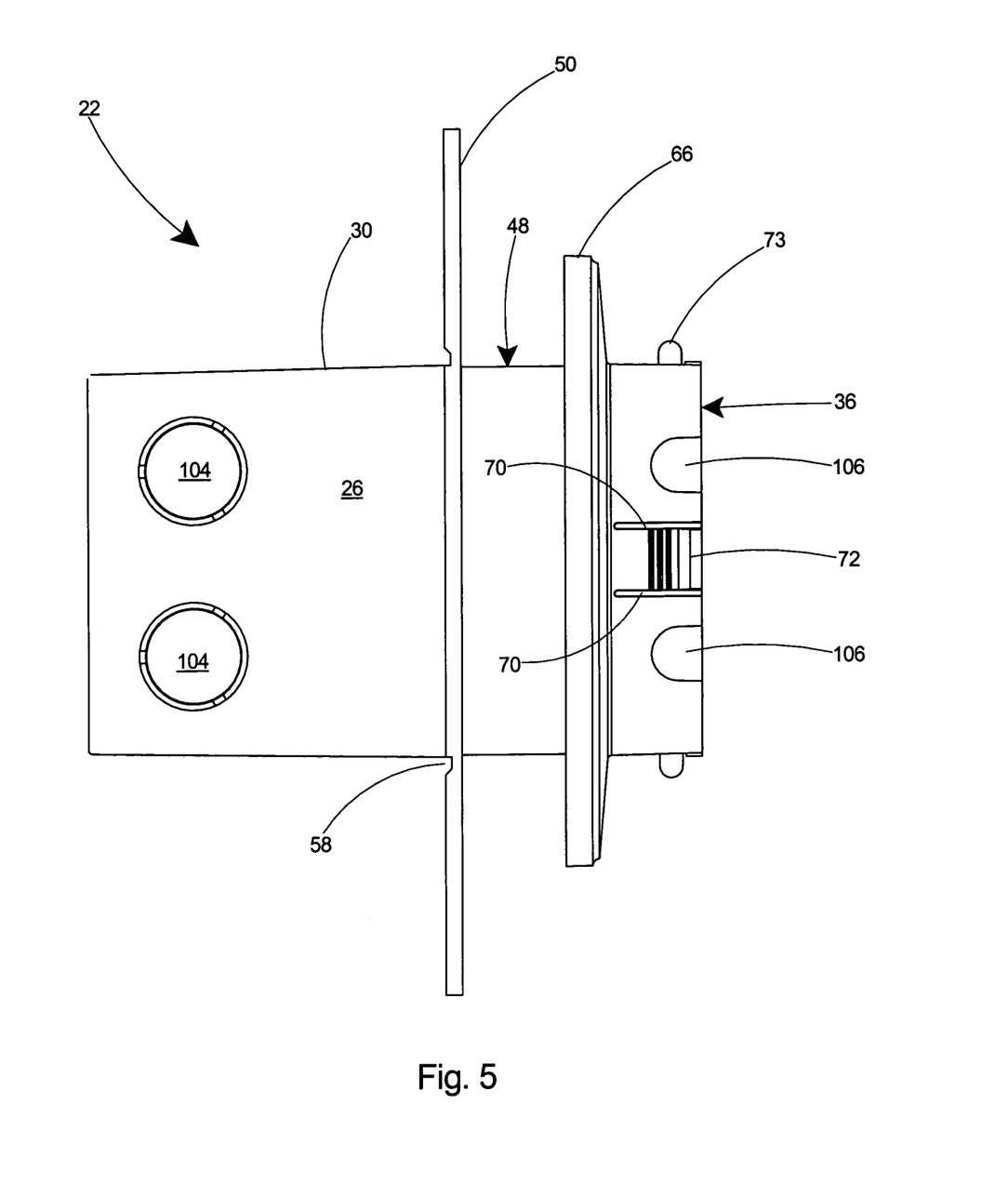
FIG. 5 is a bottom view of the recessed electrical box of FIG. 1.
Figure 6:
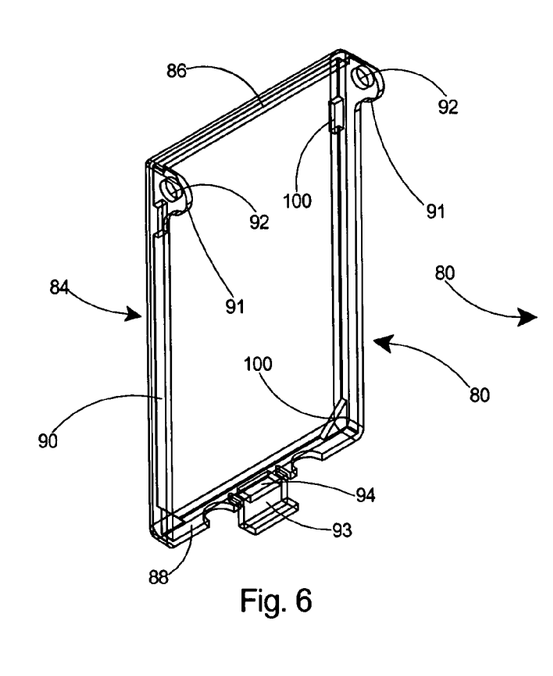
FIG. 6 is a perspective view of a cover member used with the recessed electrical box of FIG. 1.
Figure 7:
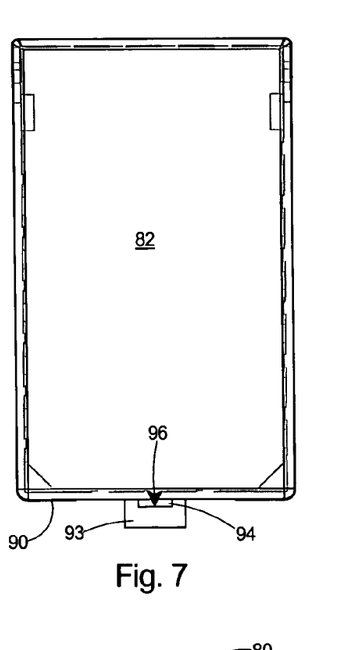
FIG. 7 is a front view of the cover member of FIG. 6.
Figure 8:
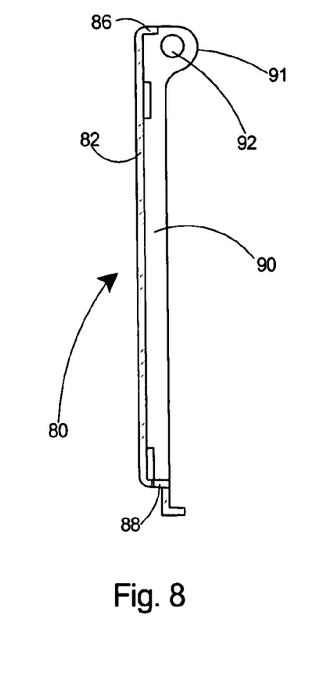
FIG. 8 is a side view of the cover member of FIG. 6.

Referring to FIG. 11, the electrical box 20 of the present invention includes an integral latch 68 at the bottom wall 26 of the box 22 at the front edge 36. As shown in FIG. 5, openings or slits 70 are included in the bottom wall 26 of the box 22. The slits 70 are perpendicular with the front edge 36 and extend substantially to the second flange 66. A latch member 72, formed by the slits 70, extends forward no farther than the front edge 36 of the box 22. With reference to FIGS. 1 and 5, posts 73 extend from the outer surface 48 of the side walls 30 near the top of the box 22.

With reference to FIG. 2, the latch member 72 includes a tongue 74 extending downward from the bottom wall 26 of the box 22 and a forward face 76 on the tongue 74. It is preferred that the forward face 76 be smoothly curved. The flange 50 and the second flange 66 extend orthogonally from the top 24, bottom 26, and side walls 30. The flange 50 and the second flange 66 are therefore in parallel planes defining a gap 78 therebetween. The size of the gap is preferably between 0.7 and 0.9 inch to enable it to accept siding of most standard thicknesses.

The cover arrangement 52 of the electrical box 20, as shown in FIG. 11, includes a cover member 80 pivotally connected to the box 22. With reference to FIGS. 6–9, the cover member 80 includes a front wall 82, a stiffening peripheral wall 84 orthogonal to the front wall 82. The stiffening peripheral wall 84 includes an upper wall 86, lower wall 88, and side walls 90. The stiffening peripheral wall 84 rigidifies and provides structural support to the front wall 82 of the cover member 80. The cover member 80, which much pass an impact test according to the electrical code, is typically constructed of high impact resistant plastic. The high impact-resistant plastic is more expensive than typical non impact-resistant plastics that are used to construct the electrical box. The cover member 80 of the present invention is therefore made as small in size as possible to lower production costs. To lower the weight of high impact resistant plastic used, the stiffening peripheral wall 84 extends no more than 0.30 inch from the front wall 82 and the front wall 82 is no greater than 3.5 inches width by 6.0 inches length. Therefore the largest volume component of the present invention consists of the box 22, which is constructed of cheaper non-impact resistant plastics. The box 22 is typically molded of non-impact resistant plastic in one piece. The cover member 80 is typically molded of high impact resistant plastic in one piece. The recessed electrical box of the present invention is therefore of two-piece construction, which is much simpler construction than the three or more piece prior art boxes.

Ears 91 extend from the top end of the side walls 90 and include apertures 92 therein. A tab 93 extends downward from the lower wall 88 of the cover member 80. The cover member 80 includes an opening 94 in the lower wall 88 of the cover member 80 and extends therefrom into the tab 93. The tab 93 includes an upper edge 96 at the opening 94. With reference to FIG. 11, when the cover member 80 is pivotally closed on the box 22, the upper edge 96 on the opening 94 in the tab 93 engages the smoothly curved forward face 76 on the tongue 74 of the box 22.

With reference to FIG. 2, the latch member 72 is shown in an unbiased position with the smoothly curved forward face 76 of the tongue 74 facing the front edge 36 of the box 22. A slight pressure applied to the cover member 80 against the box 22 causes the upper edge 96 on the tab 93 to engage the smoothly curved forward face 76 of the tongue 74 thereby biasing the tongue 74 upwards until the tongue 74 snaps into the unbiased position and thereby locks the cover member 80 to the box 22. The tongue 74 and the latch member 72 it is integral with are biased upwards by pressure from the upper edge 96 of the cover member 80 as a result of its flexibility with respect to the bottom wall 26 of the box 22. As shown in FIG. 5, the latch member 72 and tongue 74 are flexible with respect to the bottom wall 26 of the box 22 as a result of the slits 70 cut in the bottom wall 26 and defining the latch member 72. As shown in the bottom view of the box 22 depicted in FIG. 5, the slits 70 in the bottom wall 26 of the box 22 form water drainage holes therein in the box 22. The water drainage slits 70 are located adjacent the front edge 36 of the box 22, thereby allowing any minute amount of rainwater that may happen to enter the box 22 to drain towards the front of the box and away from an electrical device that is later secured therein.

Figure 14:
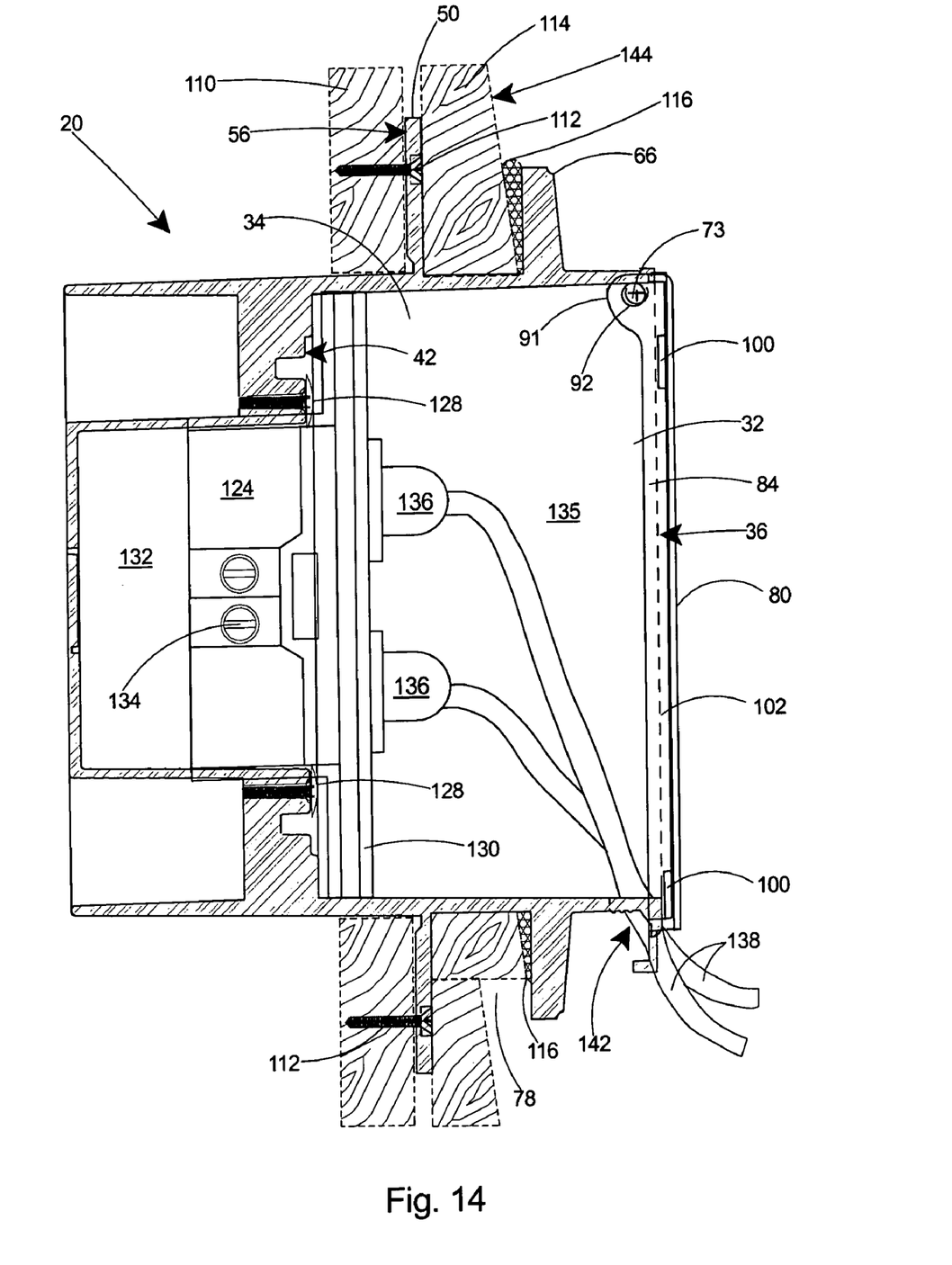
FIG. 14 is a conceptual view depicting the recessed outlet box of FIG. 1 retrofitted to an exterior wall having lapped siding and with two electrical cords plugged running from the outlet through the cable passageway in the bottom of the box and cover.

When the cover member 80 is fully closed on the box 22, as shown in FIG. 14, the stiffening peripheral wall 84 overlaps the front edge 36 of the box 22 thereby creating a rainproof enclosure 34 within the box 22.

Referring to FIGS. 6–10, the cover member 80 further includes an inner surface 98 and integral spacers 100 on the inner surface 98. As shown in FIG. 14, the integral spacers 100 maintain a gap 102 between the inner surface 98 of the cover member 80 and the box 22 when the cover member 80 is closed on the box 22.

Figure 3:
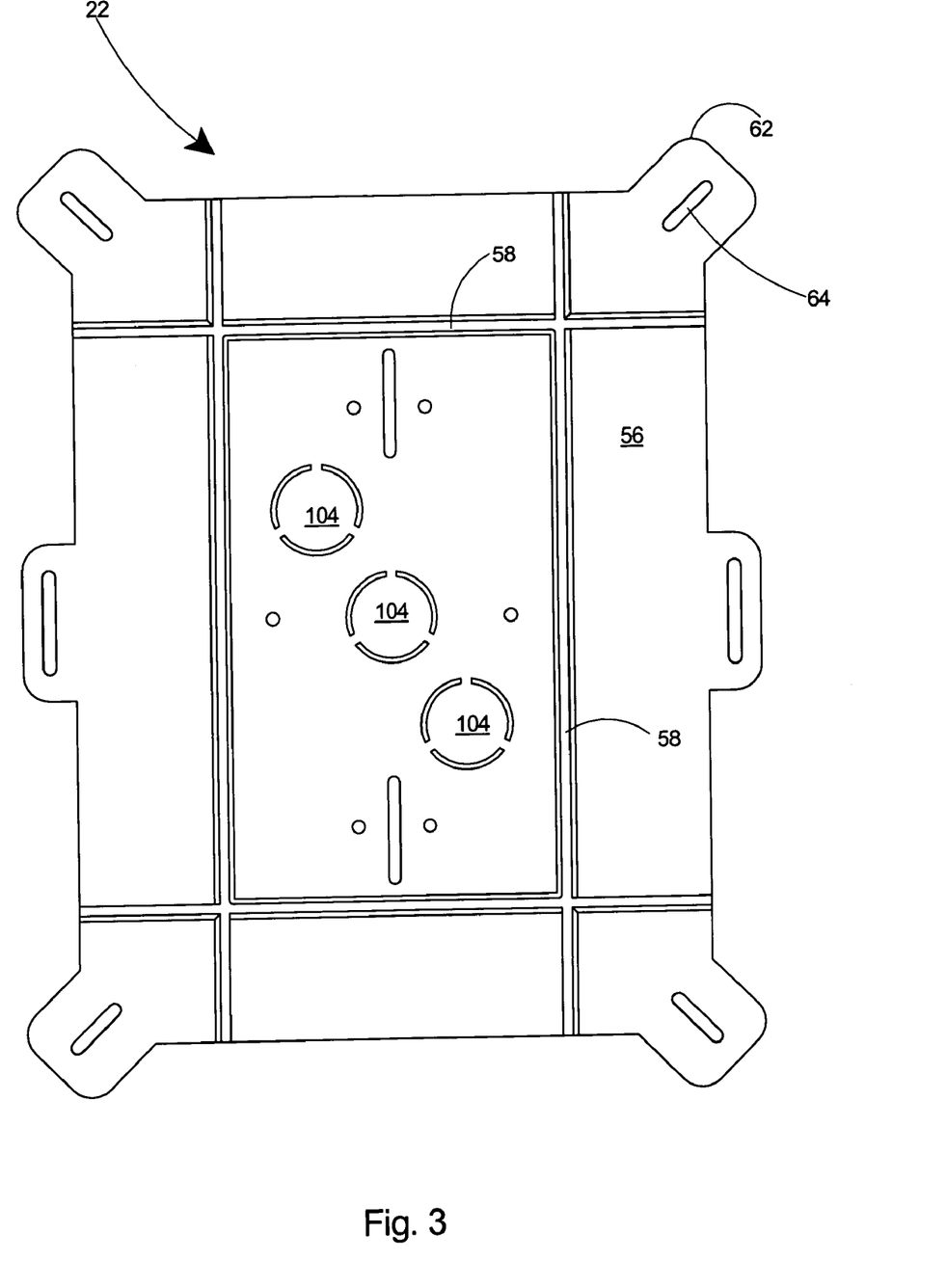
FIG. 3 is a back view of the recessed electrical box of FIG. 1.

Referring to FIGS. 1 and 3, the back wall 28 and the side walls 30 of the box 22 include one or more removable wall portions 104 or knockouts, which may be removed to provide a passage for wiring into the box 22. With reference to FIG. 5, the bottom wall 26 of the box 22 includes one or more U-shaped slots 106 extending therein from the front edge 36 at the front opening 32.

With reference to FIG. 14, the ears 91 of the cover member 47 are snapped over the posts 73 located near the planar front edge 36 of the box 22. The posts 73 protrude through the apertures 92 in the ears 91 and cover the outer front opening 32 of the box 22 and thereby form the recessed electrical box 20 of the present invention. The cover member 80 is then pivotable on the posts 73. The posts 73 and cover member 80 comprise a cover arrangement 52 for closing the front opening 32 of the box 22 in a rainproof closure.

The box 22 of the recessed electrical box is preferably integrally formed in one piece. Therefore the box 22, the flange or flanges, including the flange 50 and the second flange 66, are integrally molded in one piece. The recessed electrical box is preferably formed by injection molding of plastic. The plastic used to form the recessed electrical box is preferably polyvinyl chloride, polyethylene, or polypropylene. Alternatively, the electrical box may be formed of metal. The box 22 may be formed of metal in one piece or the box 22 and flanges 50, 66 formed separately of metal and secured together by conventional means such as screws and nuts to form the electrical box of the present invention.

The recessed electrical box of the present invention simplifies the installation of electrical devices on all types of finished exteriors, including siding or stucco. It is adaptable to being installed on newly constructed walls or as a retrofit on an existing finished wall. Newly constructed walls are those walls in which the substrate is installed on the wall but the finishing material, such as siding or stucco, has not yet been installed. Operation of the recessed electrical box is accomplished by first determining whether it will be used in new construction or as a retrofit on an existing building.

Figure 12:
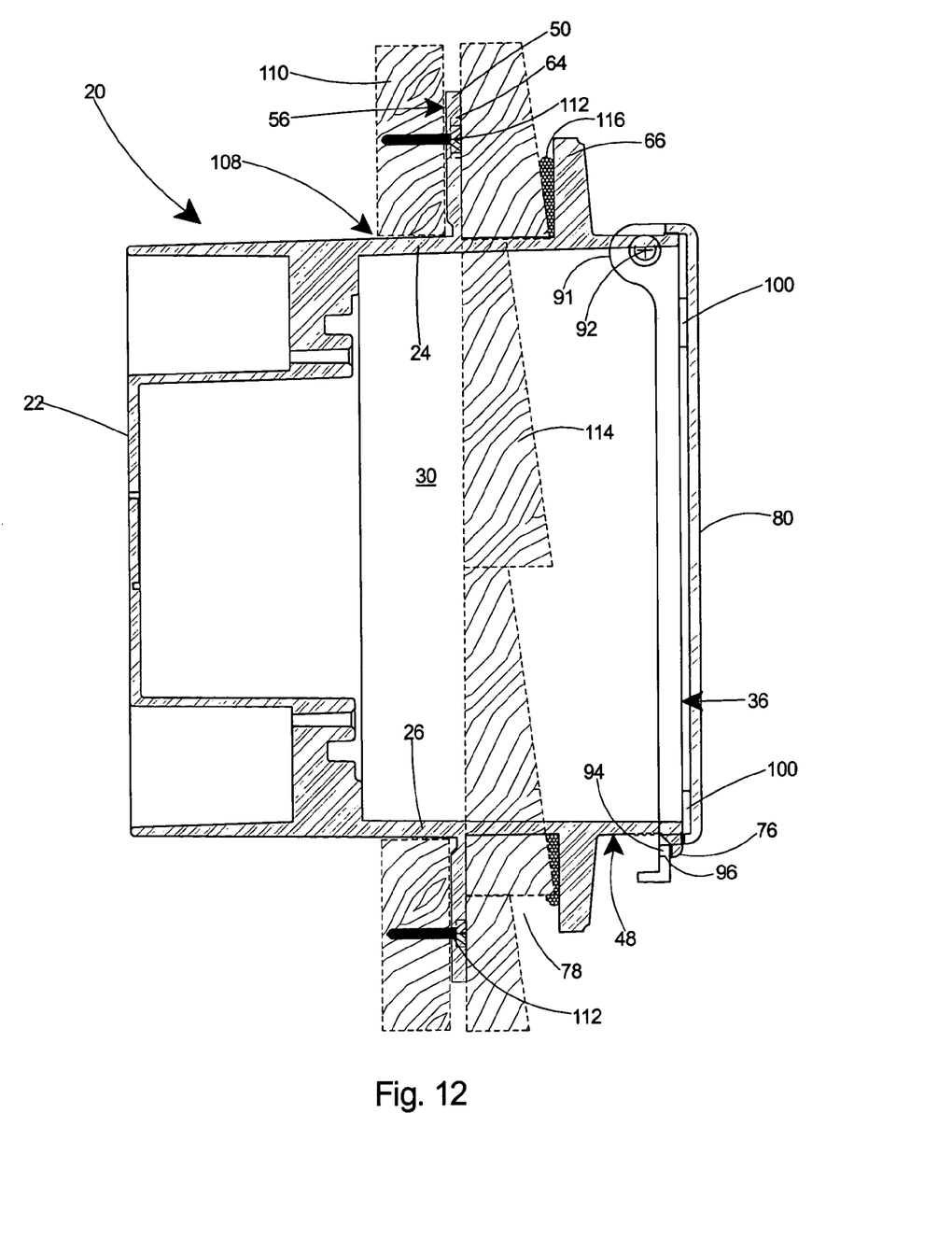
FIG. 12 is a conceptual view depicting the recessed outlet box of FIG. 1 retrofitted to an exterior wall having lapped siding.
Figure 13:
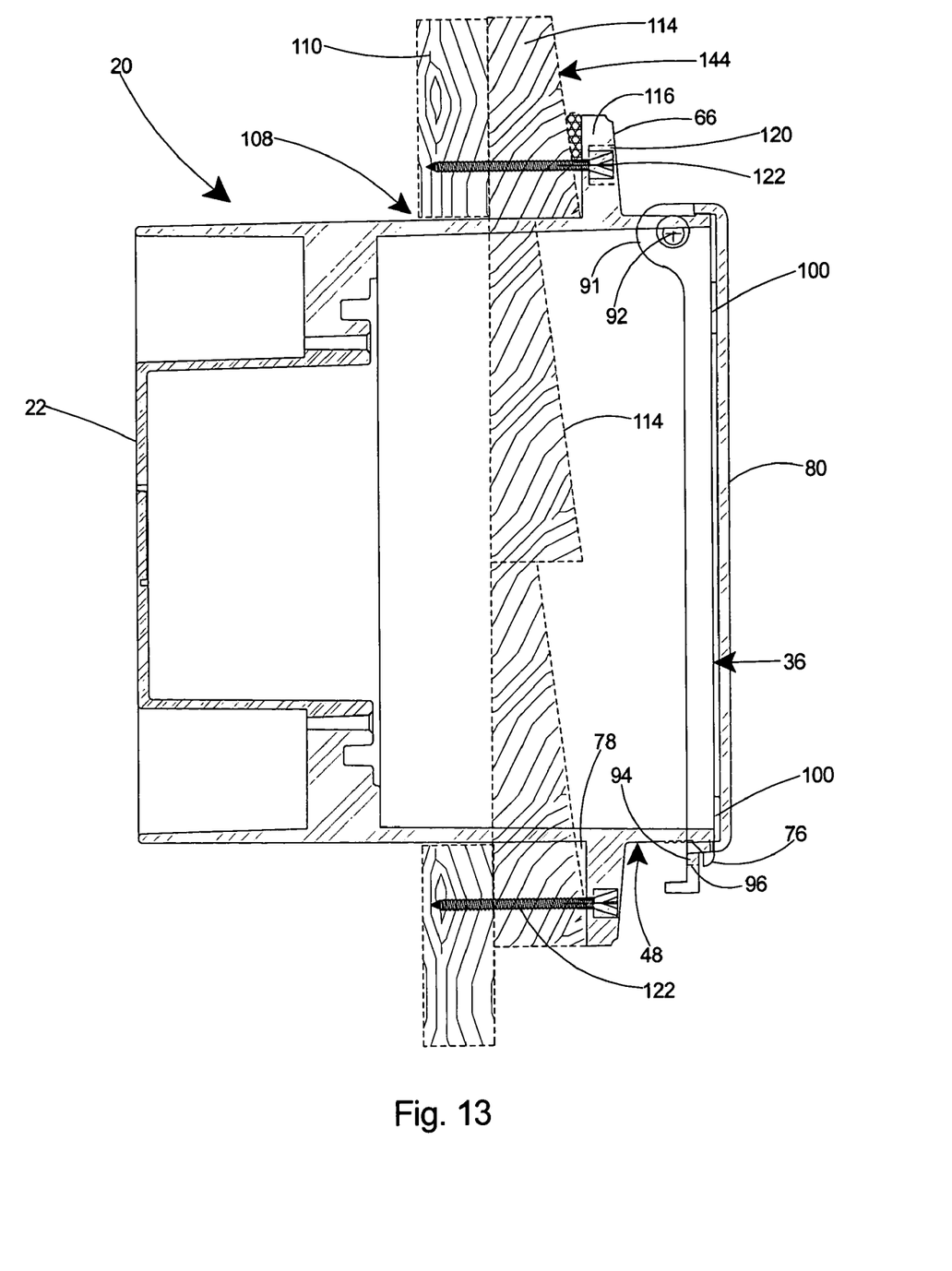
FIG. 13 is a conceptual sectional view depicting the recessed outlet box of FIG. 1 installed on a newly constructed wall and then finished with lapped siding.

For operation of the present invention, the reader is referred to FIG. 12 for an understanding of the installation procedure for the recessed electrical box on new construction and to FIG. 13 for an understanding of the installation procedure for the recessed electrical box as a retrofit on an existing building.

With reference to FIG. 12, if the building is under construction, with the substrate installed but no finished layer, the recessed electrical box is installed by first cutting an appropriately sized and shaped hole 108 in the substrate to accept the electrical box. The recessed electrical box 20 is then inserted into the hole 108 until the back surface 56 of the flange 50 is flush against the substrate 110. Fasteners 112 are then inserted through the slots 64 in the flange 50 and tightened to secure the electrical box 20 to the substrate. Installation of siding 114 on the substrate 110 then finishes the exterior of the building. The ends of the siding 114 are placed in the gap 78 flush with the outer surface 48 of the side walls 30. Caulking 116 is then applied at the juncture of the electrical box 20 with the siding 114 to seal against rain and the elements.

With reference to FIG. 13, if the building is an existing building, with both the siding and substrate installed, this is termed a "retrofit" of an electrical box to an existing building. In a retrofit situation, the recessed electrical box 20 is installed by first cutting an appropriately sized and shaped hole 118 in both the substrate 110 and the outer covering 114, which may be siding, stucco, or any other conventional outer covering material, to accept the electrical box 20. With reference to FIG. 4, for the retrofit installation, the flange 50 is removed by cutting along the grooves 58 that are adjacent the outer surface 48 of the box 22. Referring to FIG. 13, with the flange 50 removed, the electrical box 22 is inserted into the hole 118 until the back surface 67 of the second flange 66 is flush against the siding 114. Fasteners 122 are secured through preformed holes 120 in the second flange 66 and into the siding and substrate to secure the box 22 thereto. Alternatively, the holes 120 can be drilled in the second flange 66 if they are not preformed. Caulking 116 is then applied at the juncture of the electrical box 20 with the siding 114 to seal against rain and the elements.

Referring to FIG. 14, a duplex outlet 124 or other electrical device is then secured therein by device fasteners 128. A face plate 130 is fastened to the electrical device or duplex outlet 124 to close the box 22 at the forward facing surfaces 42 of the bosses 40 and thereby create an inner enclosure 132 to protect the terminals 134 of the duplex outlet 124 and any wiring therein. An outer enclosure 135 is formed in the forward end of the electrical box 20 between the face plate 130 and the cover member 80.

Figure 9:
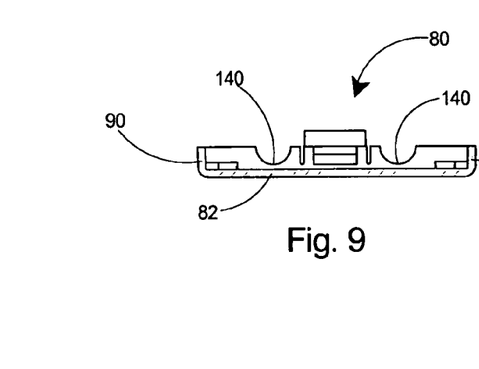
FIG. 9 is a bottom view of the cover member of FIG. 6.
Figure 10:
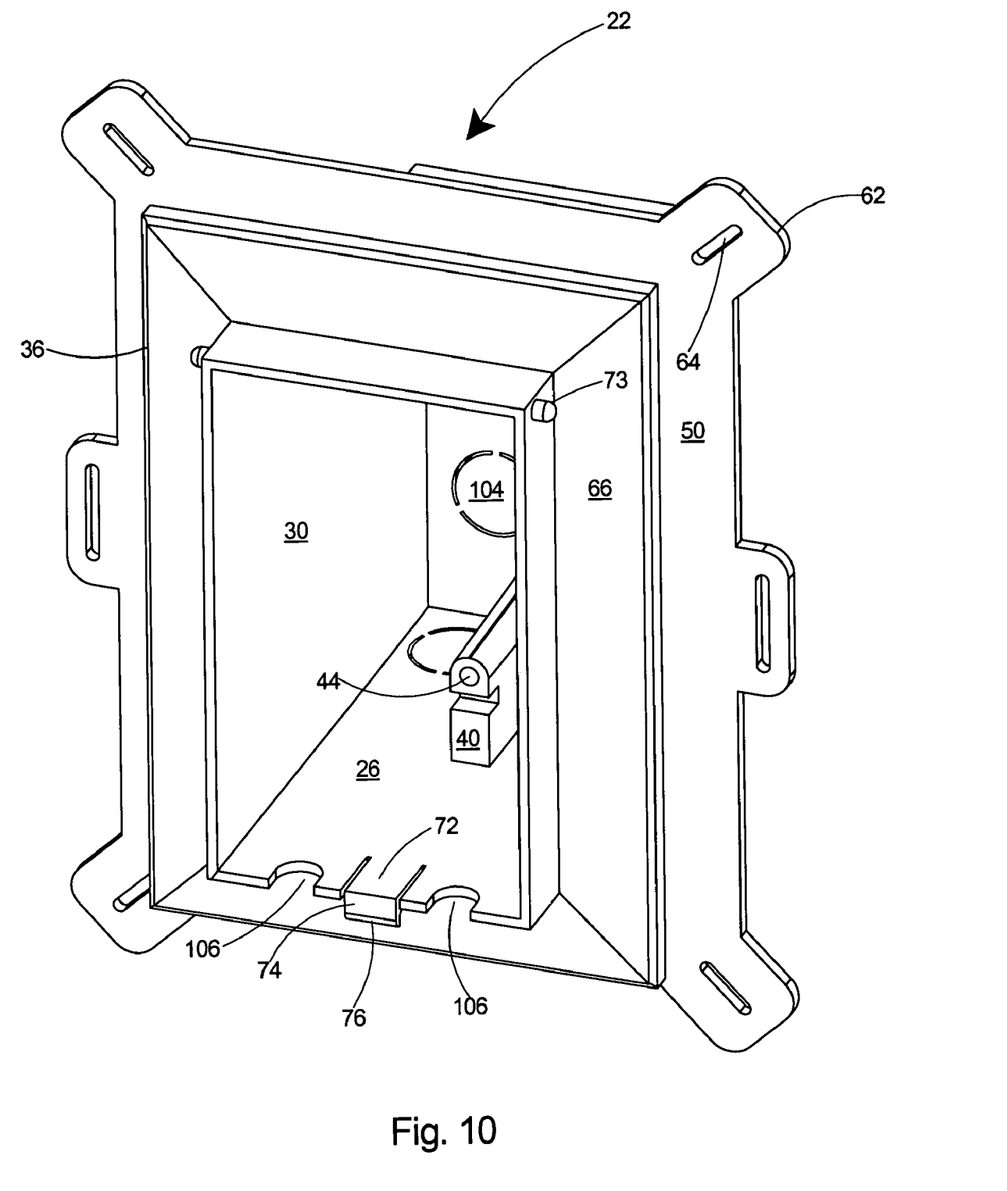
FIG. 10 is a perspective view of the recessed electrical box of FIG. 1.
Figure 15:
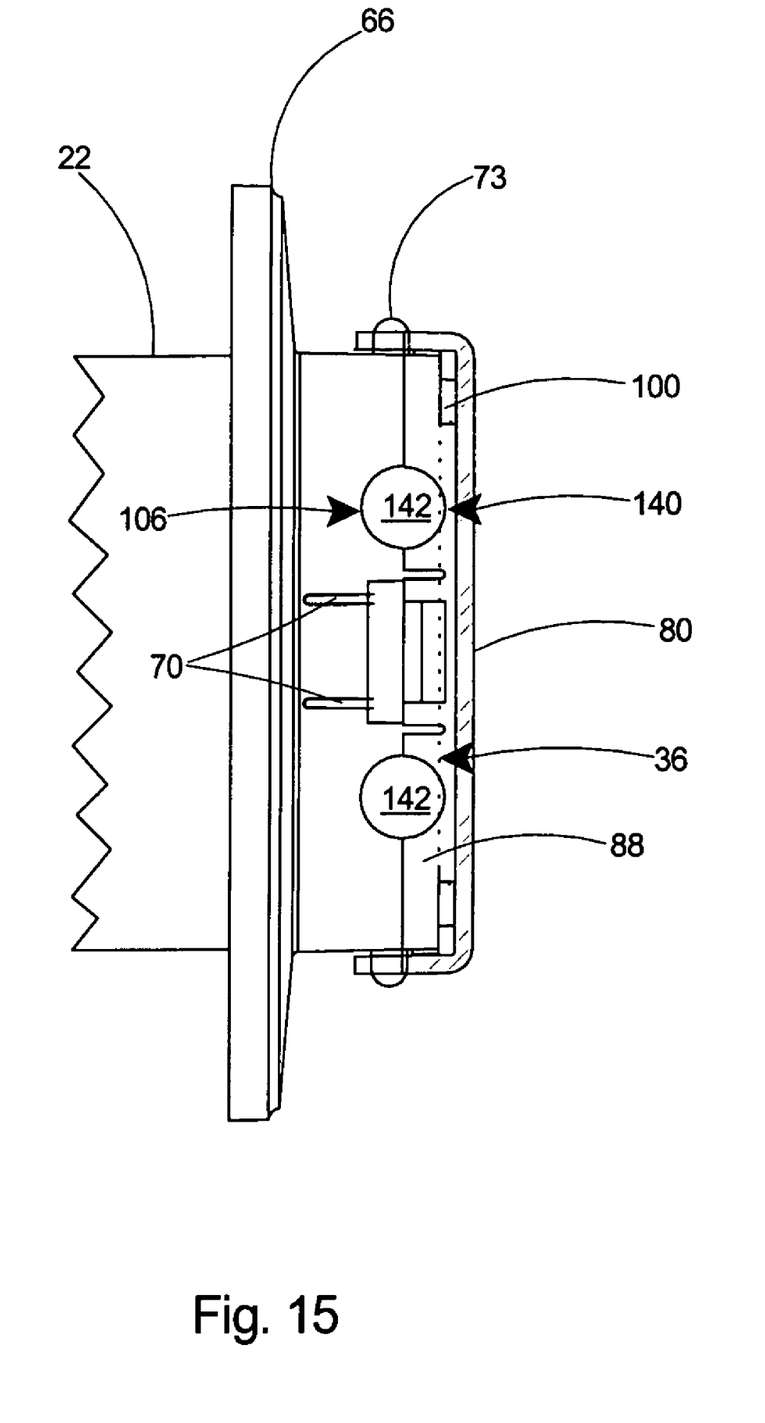
FIG. 15 is a bottom view of a portion of the recessed outlet box of FIG. 1 depicting the cover closed upon the box.

As shown in FIG. 5, the planar front edge 36 of the recessed electrical box 20 includes one or more U-shaped slots 106 in the bottom wall 26 of the box 22. As shown in FIG. 9, the cover member 80 includes one or more U-shaped slots 140 in the lower wall 88. When the cover member 80 is pivotally connected to and closed upon the box 22, as shown in FIG. 15, the U-shaped slots 106 of the box 22 mate with the U-shaped slots 140 of the cover member 80 thereby providing a substantially circular cord opening 142 therein. The circular cord openings 142 thereby form a passageway for electrical cords. When the recessed outlet box of the present invention is mounted on a building with the cord openings 142 oriented downward vertically, the recessed outlet box creates a rainproof electrical box that effectively shields the electrical device from rainfall. As shown in FIG. 14, the plug ends 136 of two electrical cords 138 are shown plugged into the duplex outlet 124 and run from the outlet 124 through the outer enclosure 135 of the recessed electrical box 20 and through the circular cord openings 142 in the electrical box.

As illustrated in FIG. 14, the recessed outlet box 20 recesses the electrical device 124 well behind the outer surface 144 of the building and protects it from impacts. With the recessed electrical box 20 secured to the outer surface 144 and caulking 116 applied between the outer surface 144 and the box 22, the box 22 and cover member 80 provide a rainproof recessed electrical box 20. With the cover 80 closed, rain is prevented from entering the box 22. The circular cord openings 142 insure that water will run out and not build up to a level that will contact the electrical device 124 or the wiring therein.

The recessed electrical box 20 is shown installed on the outer surface 144 of a building in FIG. 14. The flanges 50, 66 serve as a positioning arrangement for positioning the electrical box 20 at the correct depth with respect to the wall. Either the flange 50 or the second flange 66 serves as the positioning arrangement, depending on whether the box is installed on new construction or as a retrofit to an existing building. If the siding 114 has not been installed, the installer simply makes a hole in the substrate 110 and pushes the box 20 into the hole until the back surface 56 of the flange 50 contacts the outer surface of the substrate 110. Fasteners 112 are then driven through the flange 50 to secure the recessed electrical box 20 to the substrate 110. Siding 114 is then inserted into the gap 78 surrounding all four sides of the electrical box 20 and the siding 114 is then fastened to the substrate 110.

Alternately, in a retrofit situation, the flange 50 of recessed outlet box 20 can be broken or cut away at the grooves 58 shown in FIG. 4. The second flange 66 then serves as a positioning arrangement to achieve the proper depth of mounting of the electrical box 20. With reference to FIG. 13, a hole 118 is made in the substrate 110 and siding 114, and the electrical box 20 is pushed into the hole until the back surface 67 of the second flange 66 contacts the siding 114. Fasteners 122 are then driven through the second flange 66 and into the substrate 110 to secure the electrical box 20 to the outer surface 144 of the building. The resultant secured and anchored electrical box 20 is shown in FIG. 13.

For installation on both new construction or as a retrofit to an existing building, the electrical device 124 will be positioned substantially behind the outer surface 144 of the building, thereby providing a great deal of protection to the electrical device installed therein.

Having thus described the invention with reference to a preferred embodiment, it is to be understood that the invention is not so limited by the description herein but is defined as follows by the appended claims.

What is claimed is:

1. An electrical box for installation on a surface and comprising:
    a box having a top wall, a bottom wall, side walls, a back wall, a front opening, a front edge surrounding said front opening, and a cavity for receiving an electrical device therein;
    said back wall including a front surface;
    said top, bottom, and side walls including inner and outer surfaces;
    bosses extending from said front surface of said back wall;
    a forward facing surface on said bosses;
    said forward facing surfaces of said bosses recessed a substantial distance from said front edge;
    apertures in said facing surfaces for receiving fasteners from said electrical device;
    a flange extending from said outer surfaces of said top, bottom and side walls, said flange including a back surface;
    grooves in said back surface of said flange adjacent said side walls of said box enabling removal of said flange at said side walls; and
    a cover arrangement for closing said front opening of said box in a rain tight closure.

2. The electrical box of claim 1 including
    ears extending outwardly from said flange; and
    slots in said ears.

3. The electrical box of claim 1 including
    a second flange extending outwardly from said outer surfaces of said top, bottom, and side walls; and
    said second flange between said flange and said front edge of said box.

4. The electrical box of claim 3 wherein said flange and said second flange extend orthogonally from said top, bottom, and side walls.

5. The electrical box of claim 4 wherein
    said flange and said second flange are in parallel planes defining a gap therebetween; and
    the size of said gap is between 0.7 and 0.9 inch.

6. The electrical box of claim 1 including an integral latch at said bottom wall of said box at said front edge.

7. An electrical box for installation on a surface and comprising:
    a box having a top wall, a bottom wall, side walls, a back wall, a front opening, a front edge surrounding said front opening, and a cavity for receiving an electrical device therein;
    said back wall including a front surface;
    said top, bottom, and side walls including inner and outer surfaces;
    integral bosses extending from said front surface of said back wall;
    a forward facing surface on said bosses;
    said forward facing surfaces of said bosses recessed a substantial distance from said front edge;
    apertures in said facing surfaces for receiving fasteners from said electrical device;
    a flange extending from said outer surfaces of said top, bottom and side walls;
    a second flange extending outwardly from said outer surfaces of said top, bottom, and side walls;
    said second flange between said flange and said front edge of said box;
    a cover arrangement for closing said front opening of said box in a rain tight closure;
    slits in said bottom wall of said box, said slits perpendicular with said front edge and extending substantially to said second flange;
    a latch member formed by said slits; and
    said latch member extending forward no farther than said front edge of said box.

8. The electrical box of claim 7 including
    a tongue extending downward from said bottom wall of said box; and
    a forward face on said tongue.

9. The electrical box of claim 8 including
    a cover member pivotally connected to said box, said cover member including a front wall;
    a stiffening peripheral wall orthogonal to said front wall;
    said stiffening peripheral wall including an upper wall, lower wall, and side walls; and
    a tab extending downward from said lower wall of said cover member.

10. The electrical box of claim 9 including
    an opening in the lower wall of said cover member and extending therefrom into said tab;
    an upper edge on said tab at said opening; and
    said upper edge on said opening in said tab engaging said face on said tongue of said box when said cover member is pivotally closed on said opening of said box.

11. The electrical box of claim 10 wherein
    said latch includes an unbiased position; and
    a slight pressure applied to said cover member against said box causes said upper edge on said tab to engage said face of said tongue thereby biasing said tongue upwards until said tongue snaps into said unbiased position and thereby locks said cover member to said box.

12. The electrical box of claim 9 wherein said stiffening peripheral wall of said cover when closed on said box overlaps said front edge of said box.

13. The electrical box of claim 7 whereby said slits in said bottom wall of said box form water drainage holes therein in said box.

14. The electrical box of claim 9 wherein
said cover member includes an inner surface;
integral spacers on said inner surface; and
said integral spacers maintaining a gap between said inner surface of said cover member and said box when said cover member is closed on said box.

* * * * *